A. HILL.
LAWN MOWER.
APPLICATION FILED JUNE 3, 1907.

975,617.

Patented Nov. 15, 1910.
3 SHEETS—SHEET 2.

Witnesses
Otto E. Hoddick
Dena Nelson

Inventor
Alfred Hill
By
Attorney

A. HILL.
LAWN MOWER.
APPLICATION FILED JUNE 3, 1907.

975,617.

Patented Nov. 15, 1910.
3 SHEETS—SHEET 3.

Witnesses
Otto E. Hoddick.
Dena Nelson.

Inventor
Alfred Hill.
By
Attorney

UNITED STATES PATENT OFFICE.

ALFRED HILL, OF DENVER, COLORADO, ASSIGNOR TO THE KENDRICK AND HILL MANUFACTURING COMPANY, OF DENVER, COLORADO.

LAWN-MOWER.

975,617.

Specification of Letters Patent.   Patented Nov. 15, 1910.

Application filed June 3, 1907.   Serial No. 376,929.

*To all whom it may concern:*

Be it known that I, ALFRED HILL, a citizen of the United States, residing in the city and county of Denver and State of Colorado, have invented certain new and useful Improvements in Lawn-Mowers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in means for sharpening lawn mowers of the power class or those operated by motors or other suitable power.

In my improved construction, I provide means for reversing the action of the rotary cutter, and bringing the same into such relation with the coöperating stationary cutter, that both of the cutting devices may be quickly sharpened.

The invention will now be described in detail reference being made to the accompanying drawing in which is illustrated an embodiment thereof.

Figure 1:
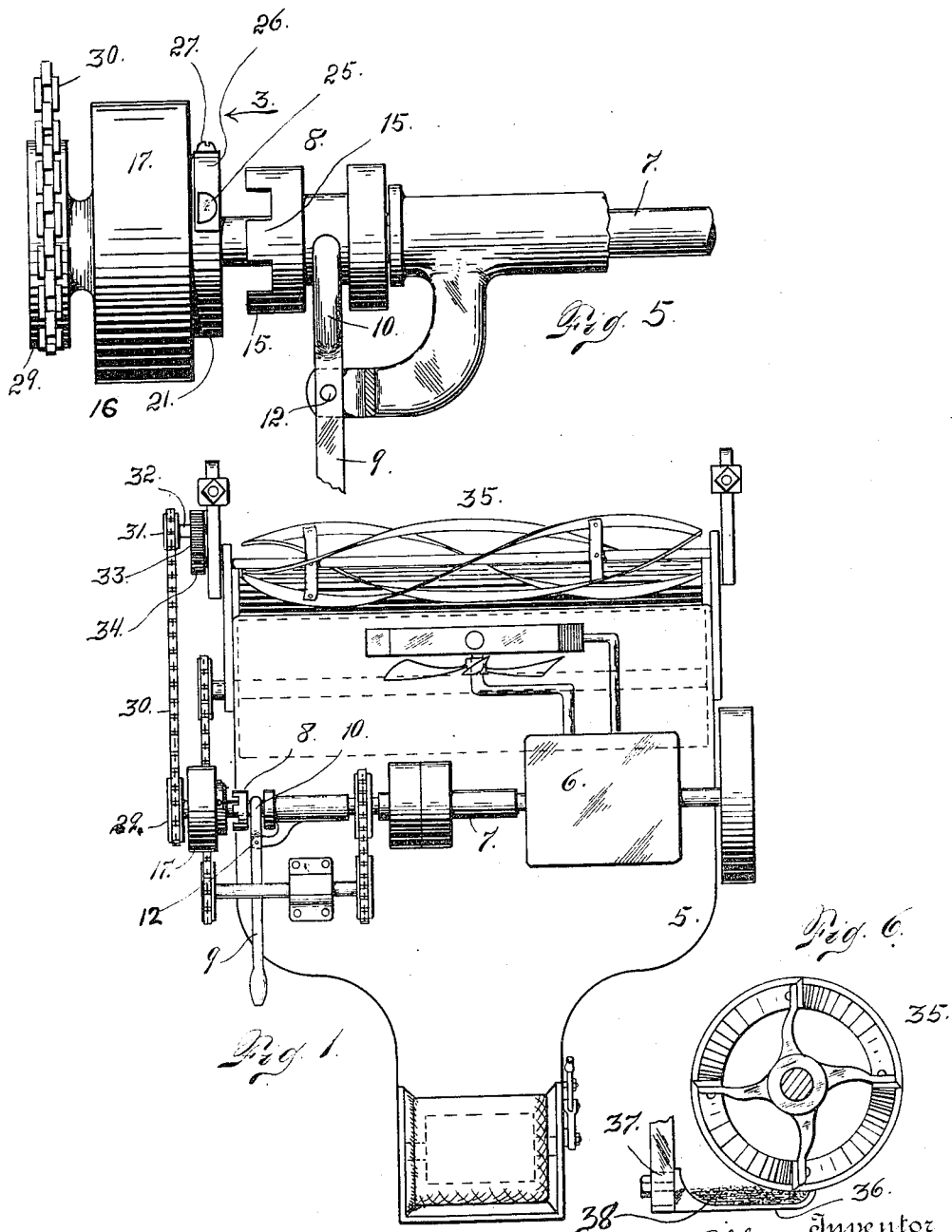
Figure 2:
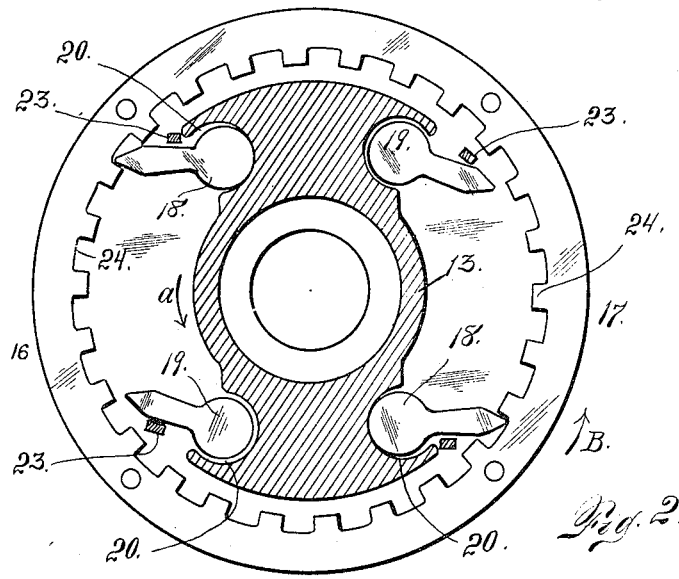
Figure 3:
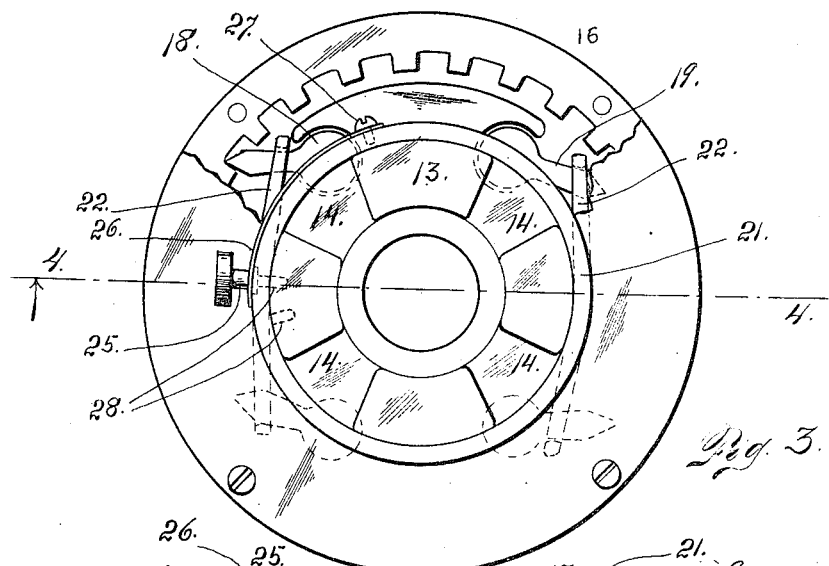
Figure 4:
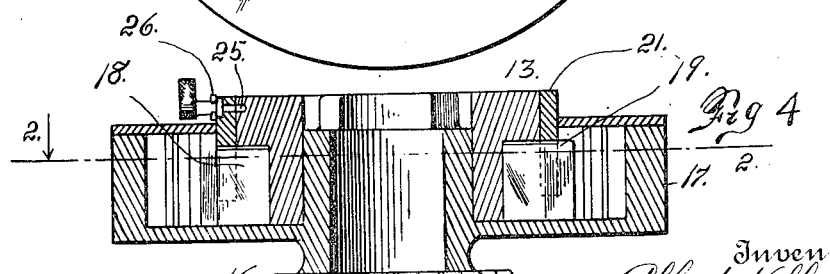
Figure 7:
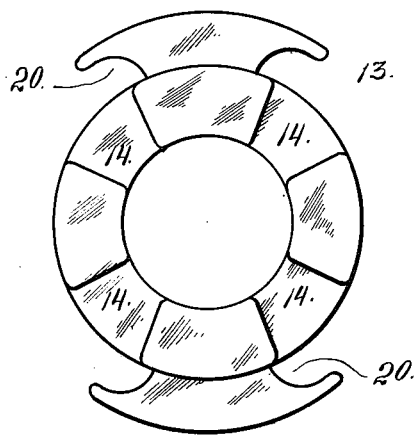
Figure 8:
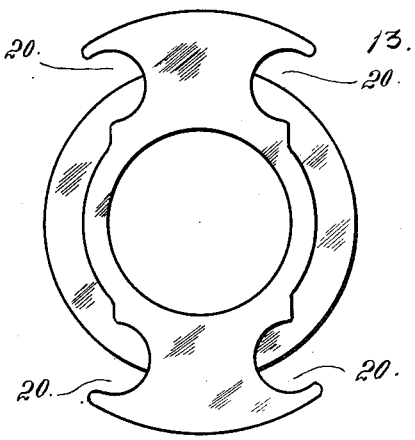
Figure 9:
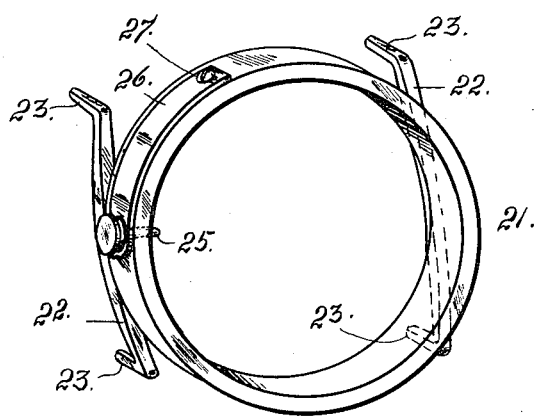

In this drawing, Figure 1 is a top plan view of a power lawn mower equipped with my improvements. Fig. 2 is a section taken through the adjustable ratchet mechanism mounted on the operating shaft. This section is taken on the line 2—2 Fig. 4 looking in the direction of the arrow. Fig. 3 is a face view of the ratchet mechanism, looking into the clutch face of the device or that coöperating with an adjustable clutch member mounted on the operating shaft. This may be said to be a view looking in the direction of arrow 3 Fig. 5. Fig. 4 is a section taken on the line 4—4 Fig. 3. Fig. 5 is an enlarged detail view, showing a portion of the operating shaft and the reversing ratchet mechanism mounted thereon, the parts being shown on a larger scale. Fig. 6 is an end view of the rotary and stationary cutters, showing the same in operative relation for sharpening purposes. Fig. 7 is a detail face view of the clutch and pawl carrying member of the reversing ratchet mechanism. This is a view looking at the clutch face of the device. Fig. 8 is a view of the opposite face of the device. Fig. 9 is a detail view in perspective of the adjustable ring, mounted on the clutch-and-pawl-carrying member and adjustable for the purpose of reversing the movement of the rotary cutter.

The same reference characters indicate the same parts in all the views.

Let the numeral 5 designate the frame work of a lawn mower upon which is mounted a motor 6 operating a shaft 7 provided with a clutch member 8 longitudinally slidable on the shaft by means of a lever 9 having a bifurcated extremity 10. This clutch member 8 is centrally grooved to receive the bifurcated extremity of the lever which is fulcrumed at 12. This clutch member 8, coöperates with the clutch face of a member 13 which is provided with recesses 14 adapted to receive the projections 15 of the member 8. The clutch member 13 is loose on the shaft 7 and its pawl carrying face shown in Fig. 8, protrudes into a ratchet wheel 16 also loosely mounted on the shaft, the clutch member and the ratchet wheel being mounted to move independently of each other. The ratchet wheel 16 is provided with an interiorly cogged or toothed circumferential flange 17 adapted to be engaged by pawls 18 and 19 loosely mounted in recesses 20 formed in the pawl carrying face of the clutch member. These pawls are of substantially similar construction but the individual members of one pair are designated 18, and the other pair 19 for convenience of description, since while one pair is active, the other pair is idle, one pair being employed to impart movement to the rotary cutter in one direction and the other pair in the opposite direction, through the medium of suitable connecting mechanism.

Surrounding the clutch face of the member 13, and adjustably mounted thereon is a ring 21 provided with two pawl regulating arms 22 located on the opposite sides of the ring and formed integral therewith. The extremities of these arms protrude beyond the periphery of the ring and are provided with interiorly projecting extremities 23. The extremities 23 of one of these arms engage pawls 18 and 19 on one side of the clutch member, while the extremities of the other arm engage the corresponding pawls 18 and 19 on the opposite side of the clutch member (see Fig. 2). By the adjustment of the ring 21, the position of the pawls may be so regulated, that the diagonally located pawls 18 (see Fig. 2) will serve to engage the toothed inner face 24 of the ratchet wheel 17, while the two pawls 19, are prevented by the engaging extremities 23 of the arms 22, from engaging the said teeth; or the ring may be so adjusted that the reverse will be true, that is to say that the pawls 19 will engage the ratchet of the wheel to operate the same while the pawls 18 will remain idle. When one pair of pawls is in engagement with the teeth of the ratchet 17, movement is imparted to the said ratchet wheel in one direction, while when the other pair of pawls engage said teeth, movement is imparted to this wheel in the opposite direction. The ring 21 is held in either position of adjustment, by a pin 25 attached to one extremity of a leaf spring 26 which is secured at its opposite extremity to the ring 21 by a screw 27. The clutch member 13 is provided with two recesses 28 adapted to receive the inner extremity of the pin 25, the recesses 28 being suitably separated. When the pin 25 engages one of these recesses, the ring is at its limit of movement in one direction, while when the pin engages the other recess the ring is at its limit of movement in the opposite direction.

The ratchet 16 is provided on its outer face with a sprocket gear 29 which is connected by means of a chain 30 with a sprocket wheel 31 fast on a shaft 32, upon which is also mounted a gear 33 meshing with a gear 34 which operates the rotary cutter 35. Below the rotary cutter 35 is the ordinary stationary cutter 36, which is vertically adjustable as shown at 37, whereby the two cutters 35 and 36 may be brought into such relation that when the rotary cutter is rotated in the opposite direction from its rotation when cutting grass, the two cutters will be sharpened.

The object of my present invention, is to provide means for reversing the action of the rotary cutter, when the motor 6 is adjusted to reverse the movement of the shaft 7 or cause it to move in the opposite direction from that required in imparting to the rotary cutter its grass cutting movement.

If it be assumed that the ring 21 is adjusted to throw the pawls 18 and 19 into the position shown in Fig. 2, and the clutch 8 be thrown into operative relation with the clutch member 13, whereby the said member is caused to rotate in the direction indicated by arrow A in Fig. 2, a corresponding rotary movement will be imparted to the ratchet wheel 17, since the centrifugal force due to the rotation of the clutch member, will throw the movable pawls 18 outwardly into operative engagement with the ratchet wheel in the direction indicated, it being assumed that this rotation of the ratchet 17 will impart the grass cutting movement to the rotary cutter 35, through the medium of the mechanism heretofore explained. Now if it is desired to sharpen the rotary cutter 35 as well as the stationary cutter 36, the latter will be so adjusted as to bring the knives of the two cutters into actual engagement. Then by shifting the ring 21 on the clutch 13, so that the said ring shall occupy its opposite limit of movement, the two pawls 18 will be held out of operative engagement by the teeth of the ratchet by the extremities 23 of the arms 22, while the pawls 19 will be left to move outwardly freely under the influence of centrifugal force, whereby they will be brought into operative engagement with the teeth of the ratchet and rotate the latter in the direction opposite the arrow B in Fig. 2. Of course in order to bring out this result, it will be necessary to reverse the action of the motor 6 whereby the rotation of the shaft 7 will be given the reverse movement from that previously explained. Under these circumstances the cutters 35 and 36 may be quickly sharpened since by the use of the motor 6, the rotary cutter may be rapidly rotated.

The cutter plate 36 is so shaped as to contain a quantity of oil and emery designated 38 (see Fig. 6), which facilitates the sharpening operation.

Having thus described my invention, what I claim is:—

1. In a lawn mower, the combination with a rotary cutter, and a stationary cutter and an operating shaft, of a ratchet wheel, loose on the shaft, an operative connection between the ratchet wheel and the said cutter, a clutch member slidable on the operating shaft, and a second clutch member loose on the operating shaft and carrying pawls arranged to engage with the teeth of the ratchet wheel, the said pawls being capable of adjustment to reverse the action of the rotary cutter, when the rotation of the said shaft is reversed.

2. In a lawn mower, the combination with the rotary cutter, and a stationary cutter and a power shaft, of a ratchet wheel loose on the power shaft, an operative connection between the ratchet wheel and the rotary cutter, a clutch member slidable on the operating shaft, and a second clutch member loose on the operating shaft and carrying pawls arranged to coöperate with the teeth of the ratchet wheel, and suitable means for regulating the position of the pawls, whereby when the pawl carrying clutch member is turned in one direction through the medium of the operating shaft and its coöperating clutch member, the ratchet wheel and the rotary cutter are correspondingly rotated, while when the said parts are turned in the opposite direction, the ratchet wheel and rotary cutter are given the reverse movement, substantially as described.

In testimony whereof I affix my signature in presence of two witnesses.

ALFRED HILL.

Witnesses:
DENA NELSON,
A. J. O'BRIEN.